(12) United States Patent
Yamazaki et al.

(10) Patent No.: US 10,894,327 B2
(45) Date of Patent: Jan. 19, 2021

(54) ROBOT

(71) Applicant: Seiko Epson Corporation, Tokyo (JP)

(72) Inventors: Takema Yamazaki, Fujimi (JP);
Ryosuke Teranaka, Matsumoto (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/194,767

(22) Filed: Nov. 19, 2018

(65) Prior Publication Data

US 2019/0152073 A1 May 23, 2019

(30) Foreign Application Priority Data

Nov. 20, 2017 (JP) ................. 2017-222715

(51) Int. Cl.
*B25J 19/00* (2006.01)
*B25J 9/16* (2006.01)
*B25J 9/04* (2006.01)

(52) U.S. Cl.
CPC ........... *B25J 19/0029* (2013.01); *B25J 9/042* (2013.01); *B25J 9/16* (2013.01); *B25J 19/0004* (2013.01)

(58) Field of Classification Search
CPC ........... B25J 19/0029; B25J 9/042; B25J 9/16
USPC .................................................. 318/568.11
See application file for complete search history.

(56) References Cited

U.S. PATENT DOCUMENTS

| 4,158,171 | A  | * | 6/1979 | Abbe ............... | G01R 31/316 318/662 |
| 6,791,291 | B2 | * | 9/2004 | Shimizu ............ | B25J 9/1615 318/568.1 |
| 9,168,660 | B2 | * | 10/2015 | Sato ............... | B25J 9/042 |
| 2005/0087034 | A1 | * | 4/2005 | Friedrich ........... | B25J 9/044 74/490.03 |
| 2005/0220021 | A1 | * | 10/2005 | Sosnowski ......... | H04M 19/08 370/235 |
| 2006/0145647 | A1 | * | 7/2006 | Kitatsuji .......... | B25J 9/1682 318/568.11 |
| 2009/0217724 | A1 | * | 9/2009 | Bosga ............. | B30B 1/266 72/29.2 |
| 2010/0033117 | A1 | * | 2/2010 | Chang ............. | H02H 9/001 318/376 |
| 2010/0050806 | A1 | * | 3/2010 | Ono ............... | B25J 9/044 74/490.02 |
| 2011/0232513 | A1 | * | 9/2011 | Bosga ............. | B30B 1/266 100/48 |
| 2013/0020804 | A1 | * | 1/2013 | Roesmann ......... | F03B 15/00 290/44 |
| 2013/0113411 | A1 | * | 5/2013 | Suzuki ............ | H02P 3/22 318/681 |
| 2013/0119902 | A1 | * | 5/2013 | Gries ............. | G01R 23/20 318/400.3 |
| 2014/0109712 | A1 | * | 4/2014 | Ono ............... | B25J 9/042 74/490.02 |

(Continued)

FOREIGN PATENT DOCUMENTS

JP 2015-085393 A 5/2015

*Primary Examiner* — Kawing Chan
(74) *Attorney, Agent, or Firm* — Harness, Dickey & Pierce, P.L.C.

(57) ABSTRACT

A robot includes an arm, a plurality of motors provided in the arm, and a pipe connected to the arm. Wires passing through the inside of the pipe include a first power line, which is one power line for supplying electric power to a pair or more of the motors among the plurality of motors.

11 Claims, 5 Drawing Sheets

(56) References Cited

U.S. PATENT DOCUMENTS

| | | | |
|---|---|---|---|
| 2014/0292231 A1* | 10/2014 | Kanada | H02J 1/10 318/34 |
| 2015/0114160 A1 | 4/2015 | Sato et al. | |
| 2015/0321344 A1* | 11/2015 | Hahakura | B25J 19/04 74/490.02 |
| 2017/0151681 A1* | 6/2017 | Endo | B25J 19/06 |
| 2017/0181802 A1* | 6/2017 | Sachs | A61B 17/00234 |
| 2017/0244284 A1* | 8/2017 | Takahashi | H02J 50/12 |

* cited by examiner

ROBOT

BACKGROUND

1. Technical Field

The present invention relates to a robot.

2. Related Art

Researches and developments of a technique for supplying electric power to a driving section such as a motor included in a robot have been conducted.

In relation to the researches and developments, there is known a robot including a piping member through which a plurality of wires are inserted (see JP-A-2015-085393 (Patent Literature 1)).

Such a robot sometimes cannot efficiently stop an arm of the robot in a desired position because of the weight of the plurality of wires passing through the inside of the piping member. When an additional member such as an end effector is attached to the robot, the number of wires inserted through the inside of the piping member increases. As a result, an occupying rate of the wires on the inside of the piping member sometimes increases.

SUMMARY

An aspect of the invention is directed to a robot including: a movable section; a plurality of driving sections provided in the movable section; and a piping member connected to the movable section. Wires passing through an inside of the piping member include a first power line, which is one power line for supplying electric power to a pair or more of the driving sections among the plurality of driving sections.

With this configuration, the robot can prevent at least one of an increase in the weight of the wires passing through the inside of the piping member and an increase in an occupying rate of the wires on the inside.

In another aspect of the invention, the robot may be configured such that the electric power supplied from the one power line is supplied to the two or more driving sections by daisy-chain connection.

With this configuration, the robot can prevent, with the supply of the electric power by the daisy-chain connection, at least one of an increase in the weight of the wires passing through the inside of the piping member and an increase in an occupying rate of the wires on the inside.

In another aspect of the invention, the robot may be configured such that the robot further includes a first power relay section configured to supply electric power to each of first driving sections, which are at least a part of the two or more driving sections, in parallel on the basis of the electric power supplied from the one power line.

With this configuration, the robot can prevent, with the supply of the electric power by the first power relay section, at least one of an increase in the weight of the wires passing through the inside of the piping member and an increase in an occupying rate of the wires on the inside.

In another aspect of the invention, the robot may be configured such that the first power relay section includes first power converting sections configured to convert the electric power supplied from the first power line into the electric power supplied to each of the first driving sections, and the first power converting sections supply the converted electric power to each of the first driving sections.

With this configuration, the robot can prevent, with the supply of the electric power by the first power converting sections, at least one of an increase in the weight of the wires passing through the inside of the piping member and an increase in an occupying rate of the wires on the inside.

In another aspect of the invention, the robot may be configured such that the robot further includes a second power relay section configured to supply electric power to each of second driving sections, which are at least a part of the two or more driving sections, in parallel on the basis of the electric power supplied from the one power line, the respective second driving sections include second power converting sections configured to convert the electric power supplied from the first power line into the electric power supplied to the second driving sections, and the second power relay section supplies the electric power supplied from the first power line to the second power converting sections respectively included in the second driving sections.

With this configuration, the robot can prevent, with the supply of the electric power to the second power converting sections of the driving sections by the second power relay section, at least one of an increase in the weight of the wires passing through the inside of the piping member and an increase in an occupying rate of the wires on the inside.

In another aspect of the invention, the robot may be configured such that the first power line is connected to a power supply section configured to output a DC voltage and may supply the DC voltage to the two or more driving sections.

With this configuration, the robot can prevent, with the supply of the DC voltage by the first power line from the power supply section, at least one of an increase in the weight of the wires passing through the inside of the piping member and an increase in an occupying rate of the wires on the inside.

In another aspect of the invention, the robot may be configured such that the power supply section is provided on an inside of the robot.

With this configuration, in the robot, the first power line can be reduced in length compared with when the power supply section is provided on the outside of the robot.

In another aspect of the invention, the robot may be configured such that capacitance elements having capacitance for accumulating electric charges of regenerative currents generated in braking of the respective two or more driving sections and a backflow preventing element configured to prevent a backflow of the regenerative currents to the power supply section are provided in the first power line, and one or both of the capacitance elements and the backflow preventing element are located on an inside of the robot.

With this configuration, the robot can prevent an inflow of the regenerative currents into the power supply section.

In another aspect of the invention, the robot may be configured such that the first power line is a twisted cable.

With this configuration, the robot can suppress radiation noise caused by the first power line.

In another aspect of the invention, the robot may be configured such that the first power line includes a shield.

With this configuration, the robot can suppress radiation noise caused by the first power line.

In another aspect of the invention, the robot may be configured such that the robot may further include a base, the movable section includes a first arm provided on the base and a second arm provided on the first arm, and the piping member connects the base and the second arm.

With this configuration, the robot can prevent at least one of an increase in the weight of the wires passing through the inside of the piping member connected to the second arm from the base and an increase in an occupying rate of the wires on the inside.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

An embodiment of the invention is explained below with reference to the drawings.
Configuration of a Robot First, the configuration of a robot 1 is explained.

Figure 1:
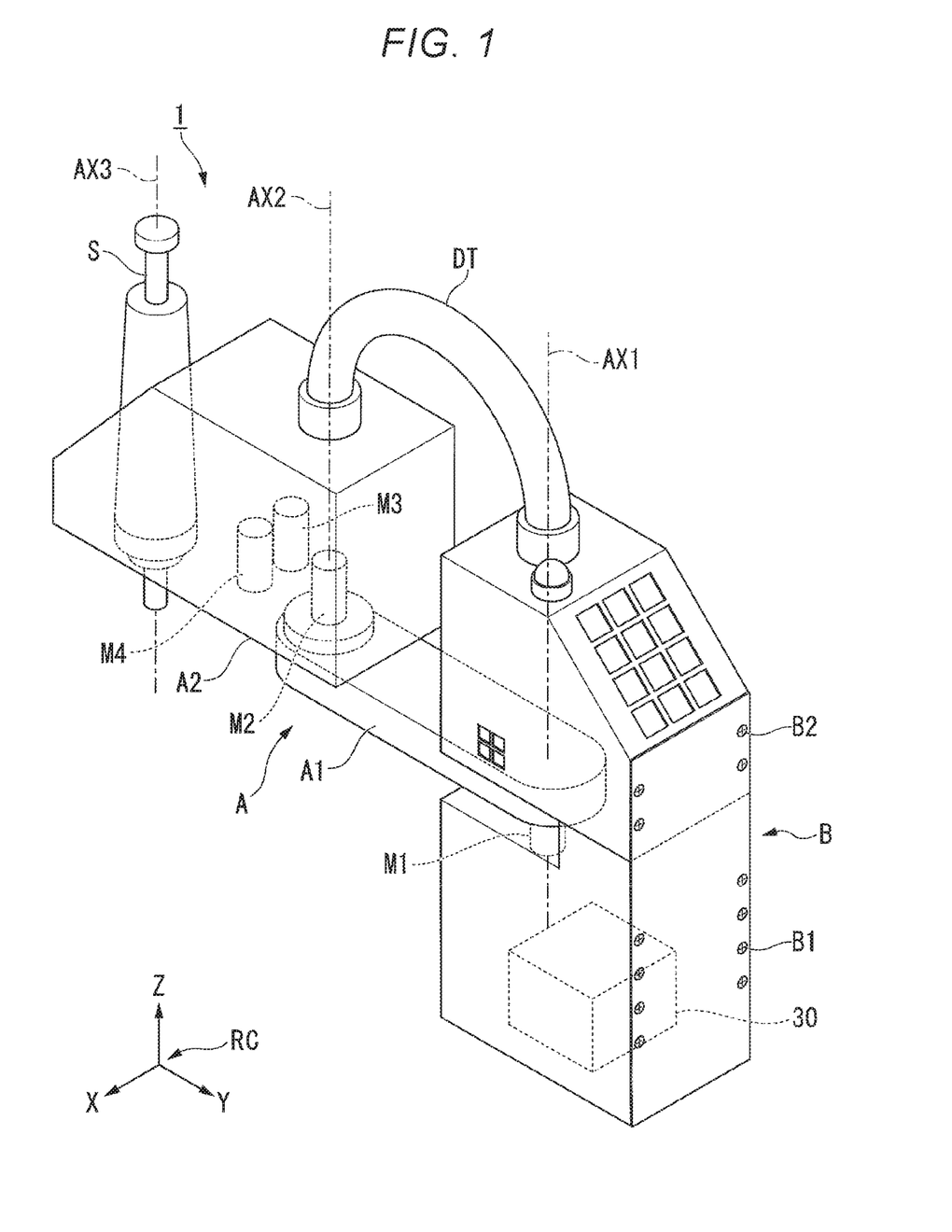
FIG. 1 is a diagram showing an example of the configuration of a robot according to an embodiment.

FIG. 1 is a diagram showing an example of the configuration of the robot 1 according to the embodiment. The robot 1 is, for example, a SCARA (horizontal articulated) robot. The robot 1 may be other robots such as a vertical articulated robot and a Cartesian coordinate robot instead of the SCARA robot. The vertical articulated robot may be a single arm robot including one arm, may be a double arm robot including two arms (a plural arm robot including two arms), or may be a plural arm robot including three or more arms. The Cartesian coordinate robot is, for example, a gantry robot.

The robot 1 includes a base B set on a setting surface, a movable section A supported by the base B, and a piping member (for example, a pipe) DT connected to the movable section A. The setting surface refers to a surface on which the robot 1 is set such as a floor surface of a room in which the robot 1 is set, a wall surface of the room, a ceiling surface of the room, the outdoor ground, an upper surface of a table, or an upper surface of a stand.

The base B is configured from two parts. One of the parts is a first base B1 and the other is a second base B2. A space on the inner side of the first base B1 is connected to a space on the inner side of the second base B2. The space on the inner side of the first base B1 and the space on the inner side of the second base B2 are examples of the inside of the base B.

The first base B1 is set on the setting surface. The first base B1 has a substantially rectangular parallelepiped (or cubic) shape as an external shape. The first base B1 is configured from tabular surfaces and is hollow. The second base B2 is fixed to a first upper surface, which is a part of the upper surface of the first base B1. The upper surface is a surface on the opposite side of the setting surface among the surfaces of the first base B1. The distance between a second upper surface, which is a portion other than the first upper surface of the upper surface of the first base B1, and the lower surface of the first base B1 is short compared with the distance between the first upper surface and the lower surface. Therefore, a gap is present between the second upper surface and the second base B2. The movable section A is provided on the second upper surface. That is, the first base B1 supports the movable section A. The shape of the first base B1 may be another shape instead of such a shape if the other shape is a shape that enables the second base B2 to be fixed to a part of the upper surface of the first base B1.

The second base B2 has, as an external shape, a shape obtained by cutting off, in a direction perpendicular to two surfaces opposed to each other configuring a rectangular parallelepiped (or a cube), a triangular portion including one vertex in each of the two surfaces to be removed. The shape obtained by cutting off the portion may be not always formed by machining for cutting off the portion and may be formed by, for example, machining for forming the same shape from the beginning. The second base B2 has such a polyhedron shape as the external shape. The second base B2 is configured from tabular surfaces and is hollow. The shape of the second base B2 may be another shape instead of such a shape if the other shape is a shape that enables the second base B2 to be fixed to a part of the upper surface of the first base B1.

The movable section A includes a first arm A1 supported turnably around a first turning axis AX1 by the base B (more specifically, the first base B1), a second arm A2 supported turnably around a second turning axis AX2 by the first arm A1, and a shaft S supported turnably around a third turning axis AX3 and translatably in the axial direction of the third turning axis AX3 by the second arm A2.

The shaft S is a columnar shaft body. A not-shown ball screw groove and a not-shown spline groove are respectively formed on the circumferential surface of the shaft S. In this example, the shaft S is provided to pierce through an end portion on the opposite side of the first arm A1 of end portions of the second arm A2 in a first direction, which is a direction in which the base B is set on the setting surface and is a direction perpendicular to the setting surface. The first direction is, for example, a direction along a Z axis in a robot coordinate system RC shown in FIG. 1. The first direction may be a direction not along the Z axis instead of the direction along the Z axis. An end effector can be attached to an end portion on the setting surface side of end portions of the shaft S. The end effector may be an end effector capable of holding an object with finger sections, may be an end effector capable of holding an object with attraction or the like by the air or magnetism, or may be other end effectors. In this embodiment, "holding the object" means "bringing the object into a state in which the object can be lifted".

In this example, the first arm A1 turns around the first turning axis AX1 and moves in a second direction. The second direction is a direction orthogonal to the first direction. The second direction is, for example, a direction along an XY plane, which is a plane formed by an X axis and a Y axis in the robot coordinate system RC. The second direction may be a direction not along the XY plane instead of the direction along the XY plane.

The first arm A1 is turned (driven) around the first turning axis AX1 by a driving section M1 included in the base B. The driving section M1 is a member capable of turning the first arm A1 around the first turning axis AX1 and is, for example, a motor unit. That is, in this example, the first turning axis AX1 is an axis coinciding with a driving axis of the driving section M1. The driving section M1 may be, instead of the motor unit, another member capable of turning the first arm A1 around the first turning axis AX1. The first turning axis AX1 and the driving axis of the driving section M1 may not coincide with each other. In this case, for example, the driving section M1 turns the first arm A1 around the first turning axis AX1 with, for example, a method of turning the first arm A1 using a pulley and a belt. Details of the driving section M1 are explained below.

In this example, the second arm A2 turns around the second turning axis AX2 and moves in the second direction. The second arm A2 is turned around the second turning axis AX2 by a driving section M2 included in the second arm A2. The driving section M2 is a member capable of turning the second arm A2 around the second turning axis AX2 and is, for example, a motor unit. That is, in this example, the second turning axis AX2 is an axis coinciding with a driving axis of the driving section M2. The driving section M2 may be another member capable of turning the second arm A2 around the second turning axis AX2 instead of the motor unit. The second turning axis AX2 and the driving axis of the driving section M2 may not coincide with each other. In this case, for example, the driving section M2 turns the second arm A2 around the second turning axis AX2 with, for example, a method of turning the second arm A2 using a pulley and a belt. Details of the driving section M2 are explained below.

The second arm A2 includes a driving section M3 and a driving section M4 and supports the shaft S. The driving section M3 moves (lifts and lowers) the shaft S in the first direction by turning, with a timing belt or the like, a ball screw nut provided in the outer circumferential portion of the ball screw groove of the shaft S. The driving section M4 turns the shaft S around the third turning axis AX3 by turning, with a timing belt or the like, a ball spline nut provided in the outer circumferential portion of the spline groove of the shaft S.

The driving section M3 is a member capable of moving (lifting and lowering) the shaft S in the first direction by turning, with a timing belt or the like, the ball screw nut provided in the outer circumferential portion of the ball screw groove of the shaft S and is, for example, a motor unit. The driving section M3 may be, instead of the motor unit, another member capable of moving (lifting and lowering) the shaft S in the first direction by turning, with a timing belt or the like, the ball screw nut provided in the outer circumferential portion of the ball screw groove of the shaft S. Details of the driving section M3 are explained below.

The driving section M4 is a member capable of turning the shaft S around the third turning axis AX3 by turning, with a timing belt of the like, the ball spline nut provided in the outer circumferential portion of the spline groove of the shaft S and is, for example, a motor unit. The driving section M4 may be, instead of the motor unit, another member capable of turning the shaft S around the third turning axis AX3 by turning, with a timing belt or the like, the ball spline nut provided in the outer circumferential portion of the spline groove of the shaft S. Details of the driving sections M4 are explained below.

In the following explanation, as an example, all of the driving sections M1 to M4 have the same configuration. In the following explanation, the driving sections M1 to M4 are collectively referred to as driving sections M unless it is necessary to distinguish each of the driving sections M1 to M4. A part or all of the driving sections M1 to M4 may have configurations different from one another. Instead of including the four driving sections M, the robot 1 may include three or less driving sections M or may include five or more driving sections M.

The robot 1 is controlled by a control device 30. The robot 1 incorporates the control device 30 on the inner side of the first base B1. The inner side is an example of the inside of the robot and is an example of the inside of the base of the robot. The robot 1 may incorporate the control device 30 in another position on the inside of the robot 1 instead of the inner side. The robot 1 may be controlled by the control device 30 externally attached to the robot 1.

The control device 30 is a controller configured to control the robot 1. The control device 30 performs, for example, supply of electric power to each of the four driving sections M (i.e., the driving sections M1 to M4) and output of a control signal to each of the four driving sections M to operate the robot 1.

As explained above, the piping member DT is connected to the movable section A. In this example, the piping member DT connects a not-shown first opening section, which is an opening section formed on the upper surface of the second base B2 among the surfaces of the base B, and a not-shown second opening section, which is an opening section formed on the upper surface of the second arm A2 among the surfaces of the movable section A. That is, in this example, the piping member DT connects the inside of the base B and the inside of the second arm A2 across the first arm A1. The inside of the second arm A2 refers to a space on the inner side of the second arm A2. The piping member DT may be connected to the movable section A instead of connecting the first opening section and the second opening section.

A plurality of wires laid from the inside of the base B to the inside of the second arm A2 pass through the piping member DT. The plurality of wires include one power line, one or more signal lines, and one or more other wires. The one power line refers to a wire used for supply of electric power from the control device 30 to each of the driving sections M2 to M4. The one or more signal lines refer to wires used for transmission of various signals (e.g., control signals) between each of the driving sections M2 to M4 and the control device 30. The one or more other wires may be any wires for connecting the control device 30, the shaft S, and members disposed on the inside of the second arm A2, the outside of the second arm A2, and the like. For example, the one or more other wires include a wire for supplying electric power to an end effector provided in the shaft S, a wire for transmitting a control signal from the control device 30 to the end effector, a wire for supplying electric power to some member disposed on the outside of the second arm A2 by a user, and a wire for transmitting a control signal from the control device 30 to the member. The plurality of wires may include other wires instead of a part or all of the one or more signal lines and the one or more other wires or may include other wires in addition to the one power line, the one or more signal lines, and the one or more other wires.

Figure 2:
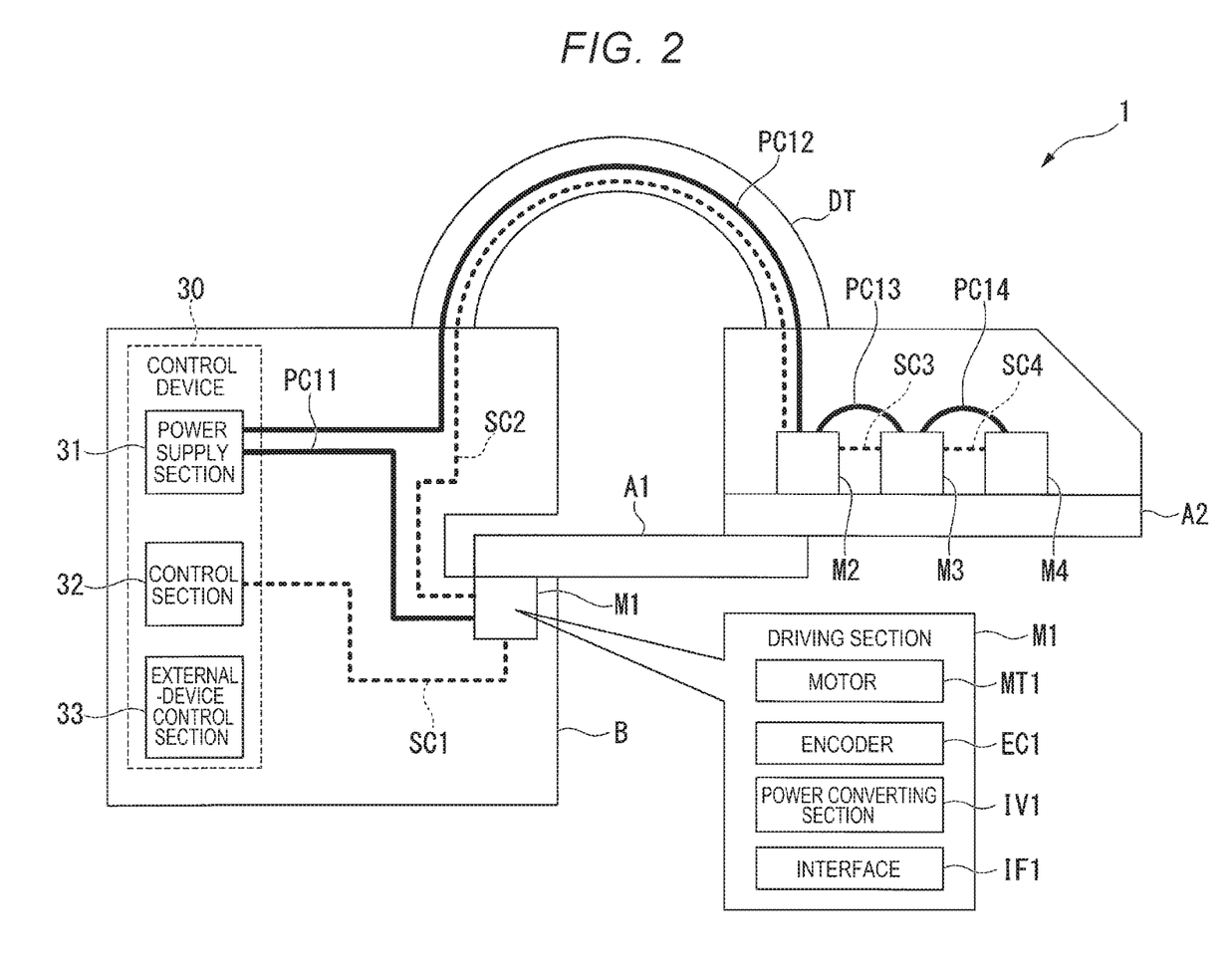
FIG. 2 is a diagram showing respective examples of the configuration of driving sections, the configuration of a control device, and a connection form of wires on the inside of the robot according to the embodiment.

Each of the configuration of the driving sections M, the configuration of the control device 30, and a connection form of the wires on the inside of the robot 1 according to the embodiment is explained with reference to FIG. 2. FIG. 2 is a diagram showing respective examples of the configuration of the driving sections M, the configuration of the control device 30, and the connection form of the wires on the inside of the robot 1 according to the embodiment.

The driving sections M respectively include motors MT, encoders EC, power converting sections IV, and interfaces IF. That is, the driving section M1 includes the motor MT, the encoder EC, the power converting section IV, and the interface IF. The driving section M2 includes the motor MT, the encoder EC, the power converting section IV, and the interface IF. The driving section M3 includes the motor MT, the encoder EC, the power converting section IV, and the interface IF. The driving section M4 includes the motor MT, the encoder EC, the power converting section IV, and the interface IF.

In the following explanation, for convenience of explanation, the motor MT, the encoder EC, the power converting section IV, and the interface IF included in the driving section M1 are respectively referred to as motor MT1, encoder EC1, power converting section IV1, and interface IF1. In the following explanation, the motor MT, the encoder EC, the power converting section IV, and the interface IF included in the driving section M2 are respectively referred to as motor MT2, encoder EC2, power converting section IV2, and interface IF2. In the following explanation, the motor MT, the encoder EC, the power converting section IV, and the interface IF included in the driving section M3 are respectively referred to as motor MT3, encoder EC3, power converting section IV3, and interface IF3. In the following explanation, the motor MT, the encoder EC, the power converting section IV, and the interface IF included in the driving section M4 are respectively referred to as motor MT4, encoder EC4, power converting section IV4, and interface IF4.

As explained above, the driving sections M1 to M4 may have configurations different from one another. Therefore, the motors MT1, MT2, MT3, and MT4 may have configurations different from one another. The encoders EC1, EC2, EC3, and EC4 may have configurations different from one another. The power converting sections IV1, IV2, IV3, and IV4 may have configurations different from one another. The interfaces IF1, IF2, IF3, and IF4 may have configurations different from one another.

In FIG. 2, to prevent the figure from being complicated, illustration of each of the motor MT2, the encoder EC2, the power converting section IV2, and the interface IF2 included in the driving section M2, each of the motor MT3, the encoder EC3, the power converting section IV3, and the interface IF3 included in the driving section M3, and each of the motor MT4, the encoder EC4, the power converting section IV4, and the interface IF4 included in the driving section M4 is omitted.

Concerning each of the motors MT1 to MT4, each of the encoders EC1 to EC4, each of the power converting sections IV1 to IV4, and each of the interfaces IF1 to IF4, each of the motor MT1, the encoder EC1, the power converting section IV1, and the interface IF1 is explained as an example.

The motor MT1 is, for example, a servomotor. The motor MT1 may be any other motor instead of the servomotor.

The encoder EC1 detects information indicating a turning angle of the motor MT1 included in the driving section M1. The encoder EC1 may be an encoder of any type such as an optical type, a magnetic type, or a mechanical type if the encoder is capable of detecting the information indicating the turning angle of the motor MT1 included in the driving section M1.

The power converting section IV1 converts supplied electric power into electric power supplied to the motor MT1 included in the driving section M1. The power converting section IV1 is, for example, an inverter. The power converting section IV1 may be any power converting section if the power converting section is capable of converting the supplied electric power into the electric power supplied to the motor MT1 included in the driving section M1.

The interface IF1 includes a driving circuit configured to drive the motor MT1. The interface IF1 drives the motor MT1 with the driving circuit on the basis of the electric power supplied from the power converting section IV1 and the control signal acquired from the control device 30.

In this example, the respective configurations of the motor MT, the encoder EC, the power converting section IV, and the interface IF included in each of the driving sections M2 to M4 are the same as the respective configurations of the motor MT1, the encoder EC1, the power converting section IV1, and the interface IF1 included in the driving section M1. Therefore, explanation of the configurations is omitted.

The control device 30 includes a power supply section (for example, a power supply circuit) 31, a control section 32, and an external-device control section 33.

The power supply section 31 outputs a voltage based on electric power (AC power or DC power) supplied from the outside of the robot 1. In the following explanation, as an example, the power supply section 31 outputs a DC voltage based on electric power supplied from the outside of the robot 1. The power supply section 31 may be configured to output an AC voltage based on the electric power supplied from the outside of the robot 1.

More specifically, the power supply section 31 includes a plurality of output terminals. For example, the power supply section 31 includes not-shown four output terminals as the plurality of output terminals. In this example, the four output terminals include an eleventh output terminal, which is an output terminal on a positive electrode side in DC power, a twelfth output terminal, which is an output terminal on the positive electrode side in the DC power and is an output terminal different from the eleventh output terminal, a twenty-first output terminal, which is an output terminal corresponding to the eleventh output terminal and is an output terminal on a negative electrode side in the DC power, and a twenty-second output terminal, which is an output terminal corresponding to the twelfth output terminal and is an output terminal on the negative electrode side in the DC power.

The power supply section 31 causes a potential difference (i.e., the DC voltage explained above) individually between the eleventh output terminal and the twenty-first output terminal and between the twelfth output terminal and the twenty-second output terminal on the basis of the electric power supplied from the outside of the robot 1.

In the example shown in FIG. 2, the power supply section 31 is connected to the driving section M1 by a power line PC11. More specifically, the power supply section 31 is connected to the power converting section IV1 of the driving section M1 by the power line PC11. The power supply section 31 supplies DC power to the power converting section IV1 with the power line PC11. The power converting section IV1 converts the DC power supplied from the power supply section 31 by the power line PC11 into electric power supplied to the driving section M1. The power converting section IV1 supplies the converted electric power to the interface IF1 of the driving section M1. The interface IF1 supplies the electric power supplied from the power converting section IV1 to the motor MT1. That is, the power supply section 31 supplies the electric power to the driving section M1 via the power line PC11.

The power line PC11 is a wire (i.e., a twisted cable) obtained by twisting and integrating a wire connected to the eleventh output terminal of the power supply section 31 and a wire connected to the twenty-first output terminal of the power supply section 31. Consequently, the robot 1 can suppress radiation noise caused by the power line PC11. The power line PC11 may be a wire obtained by integrating the wire connected to the eleventh output terminal of the power supply section 31 and the wire connected to the twenty-first output terminal of the power supply section 31 without twisting the wire. The power line PC11 may include a shield or may not include the shield. When the power line PC11 includes the shield, the robot 1 can more surely suppress radiation noise caused by the power line PC11.

In the example shown in FIG. 2, the power supply section 31 is connected to the driving section M2 by a power line PC12. More specifically, the power supply section 31 is connected to the power converting section IV2 of the driving section M2 by the power line PC12. The power supply section 31 supplies DC power to the power converting section IV2 with the power line PC12. The power converting section IV2 converts the DC power supplied from the power supply section 31 by the power line PC12 into electric power supplied to the driving section M2. The power converting section IV2 supplies the converted electric power to the interface IF2 of the driving section M2. The interface IF2 supplies the electric power supplied from the power converting section IV2 to the motor MT2. That is, the power supply section 31 supplies the electric power to the driving section M2 via the power line PC12.

The power line PC12 is a wire (i.e., a twisted cable) obtained by twisting and integrating a wire connected to the twelfth output terminal of the power supply section 31 and a wire connected to the twenty-second output terminal of the power supply section 31. Consequently, the robot 1 can suppress radiation noise caused by the power line PC12. The power line PC12 may be a wire obtained by integrating the wire connected to the twelfth output terminal of the power supply section 31 and the wire connected to the twenty-second output terminal of the power supply section without twisting the wire. The power line PC12 may include a shield or may not include the shield. When the power line PC12 includes the shield, the robot 1 can more surely suppress radiation noise caused by the power line PC12.

The power line PC12 is laid from the base B to the inside of the second arm A2 through the piping member DT. That is, the power line PC12 is an example of the one power line.

In the example shown in FIG. 2, the driving section M2 and the driving section M3 are connected by a power line PC13. More specifically, the power converting section IV2 of the driving section M2 and the power converting section IV3 of the driving section M3 are connected by the power line PC13. In the example, the driving section M3 and the driving section M4 are connected by a power line PC14. More specifically, the power converting section IV3 of the driving section M3 and the power converting section IV4 of the driving section M4 are connected by the power line PC14. The power converting section IV2 of the driving section M2 supplies electric power supplied from the power supply section 31 via the power line PC12 to the power converting section IV3 of the driving section M3 via the power line PC13. In the example, the power converting section IV3 of the driving section M3 supplies the electric power supplied from the power converting section IV2 of the driving section M2 via the power line PC13 to the power converting section IV4 of the driving section M4 via the power line PC14. That is, in the example, the electric power supplied from the power line PC12 is supplied to each of the driving section M2, the driving section M3, and the driving section M4 (i.e., the plurality of driving sections M provided in the movable section A) by daisy-chain connection.

The power line PC13 is a wire (i.e., a twisted cable) obtained by twisting and integrating a wire electrically connected to the twelfth output terminal of the power supply section 31 via the power line PC12 and a wire electrically connected to the twenty-second output terminal of the power supply section 31 via the power line PC12. Consequently, the robot 1 can suppress radiation noise caused by the power line PC13. The power line PC13 may be a wire obtained by integrating the wire electrically connected to the twelfth output terminal of the power supply section 31 via the power line PC12 and the wire electrically connected to the twenty-second output terminal of the power supply section 31 via the power line PC12 without twisting the wire. The power line PC13 may include a shield or may not include the shield. When the power line PC13 includes the shield, the robot 1 can more surely suppress radiation noise caused by the power line PC13.

The power line PC14 is a wire (i.e., a twisted cable) obtained by twisting and integrating a wire electrically connected to the twelfth output terminal of the power supply section 31 via the power line PC12 and the power line PC13 and a wire electrically connected to the twenty-second output terminal of the power supply section via the power line PC12 and the power line PC13. Consequently, the robot 1 can suppress radiation noise caused by the power line PC14. The power line PC14 may be a wire obtained by integrating the wire electrically connected to the twelfth output terminal of the power supply section 31 via the power line PC12 and the power line PC13 and the wire electrically connected to the twenty-second output terminal of the power supply section 31 via the power line PC12 and the power line PC13 without twisting the wire. The power line PC14 may include a shield or may not include the shield. When the power line PC14 includes the shield, the robot 1 can more surely suppress radiation noise caused by the power line PC14.

As explained above, the power supply section 31 directly supplies the DC power to the driving section M1 via the power line PC11 and supplies the DC power to each of the driving sections M2 to M4 via the power line PC12 by the daisy-chain connection. Consequently, the power supply section 31 can prevent at least one of an increase in the weight of the wires passing through the inside of the piping member DT and an increase in an occupying rate of the wires on the inside and can prevent an increase in a power loss due to an increase in the daisy-chain connection. Consequently, the power supply section 31 can prevent a power line from increasing in length on the inside of the base B.

The DC power may be supplied to the driving section M2 from the driving section M1 via the power line PC12 instead of being supplied from the control device 30 via the power line PC12. That is, in the robot 1, the electric power may be supplied to each of the driving sections M1 to M4 from the control device 30 by the daisy-chain connection. In this case, the power line PC12 connects the power converting section IV1 of the driving section M1 and the power converting section IV2 of the driving section M2.

The control section 32 calculates turning angles of the respective four driving sections M according to an operation program stored in advance in a not-shown storing section. The control section 32 outputs control signals including information indicating the respective calculated turning angles to the driving sections M.

In the example shown in FIG. 2, the control section 32 is connected to the interface IF1 of the driving section M1 by a signal line SC1. The control section 32 outputs the control signals including the information indicating the turning angles of the respective driving sections M1 to M4 to the interface IF1 through the signal line SC1. The interface IF1 drives the motor MT1 of the driving section M1 on the basis of the control signal including the information indicating the turning angle of the driving section M1 among the acquired control signals.

In the example shown in FIG. 2, the interface IF1 of the driving section M1 and the interface IF2 of the driving section M2 are connected by a signal line SC2. In the example, the interface IF2 of the driving section M2 and the interface IF3 of the driving section M3 are connected by a signal line SC3. In the example, the interface IF3 of the driving section M3 and the interface IF4 of the driving section M4 are connected by a signal line SC4.

The signal line SC2 is laid from the base B to the inside of the second arm A2 through the piping member DT. That is, the signal line SC2 is an example of the one or more signal lines.

In the example shown in FIG. 2, the interface IF1 of the driving section M1 outputs, to the interface IF2 of the driving section M2 via the signal line SC2, the control signals including the information indicating the turning angles of the respective driving sections M2 to M4 among the control signals including the information indicating the turning angles of the respective driving sections M1 to M4 output from the control section 32 via the signal line SC1. The interface IF2 drives the motor MT2 of the driving section M2 on the basis of the control signal including the information indicating the turning angle of the respective driving section M2 among the acquired control signals. The interface IF2 outputs, to the interface IF3 of the driving section M3 via the signal line SC3, the control signals including the information indicating the turning angles of the respective driving sections M3 and M4 among the control signals including the information indicating the turning angles of the respective driving sections M2 to M4 output from the interface IF1 of the driving section M1 via the signal line SC2. The interface IF3 drives the motor MT3 of the driving section M3 on the basis of the control signal including the information indicating the turning angle of the driving section M3 among the acquired control signals. The interface IF3 outputs, to the interface IF4 of the driving section M4 via the signal line SC4, the control signal including the information indicating the turning angle of the driving section M4 of the control signals including the information indicating the turning angles of the respective driving sections M3 and M4 output from the interface IF2 of the driving section M2 via the signal line SC3. The interface IF4 drives the motor MT4 of the driving section M4 on the basis of the acquired control signal including the information indicating the turning angle of the driving section M4.

The control signal 32 may be configured to output control signals to other members in addition to the control signals output to the respective four driving sections M or may be configured not to output the control signals to the other members. The other members include, for example, an LED (Light Emitting Diode) indicating whether the movable section A is operating.

That is, in the example shown in FIG. 2, each of the driving sections M1 to M4 acquires, with the daisy-chain connection, the control signal output from the control section 32.

The external-device control section 33 controls external devices attached to the robot 1 by the user. The external devices include, for example, an end effector attached to the shaft S. The external-device control section 33 is connected to the external devices by a not-shown wire. The wire may be drawn around to the inside of the second arm A2 through the piping member DT or may be drawn around to the outside of the second arm A2 not through the piping member DT.

As explained above, the robot 1 includes the movable section (in this example, the movable section A), the plurality of driving sections (in this example, the driving sections M2 to M4) provided in the movable section, and the piping member (in this example, the piping member DT) connected to the movable section. In the robot 1, the wires passing through the inside of the piping member include the first power line (in this example, the power line PC12), which is the one power line for supplying electric power to the two or more driving sections among the plurality of driving sections. Consequently, the robot 1 can prevent at least one of an increase in the weight of the wires passing through the inside of the piping member and an increase in an occupying rate of the wires on the inside.

In the robot 1, electric power supplied from the one power line is supplied to the two or more driving sections by the daisy-chain connection. Consequently, the robot 1 can prevent, with the supply of the electric power by the daisy-chain connection, at least one of an increase in the weight of the wires passing through the inside of the piping member and an increase in an occupying rate of the wires on the inside.

In the robot 1, the first power line is connected to the power supply section (in this example, the power supply section 31) configured to output a DC voltage. The first power line supplies the DC voltage to the two or more driving sections. Consequently, the robot 1 can prevent, with the supply of the DC voltage from the power supply section by the first power line, at least one of an increase in the weight of the wires passing through the inside of the piping member and an increase in an occupying rate of the wires on the inside.

In the robot 1, the power supply section is provided on the inside of the robot 1. Consequently, the robot 1 can reduce the wires between the power supply section and the driving section in length. In the robot 1, the first power line can be reduced in length compared with when the power supply section is provided on the outside of the robot 1.

In the robot 1, the first power line is the twisted cable. Consequently, the robot 1 can suppress radiation noise caused by the first power line.

In the robot 1, the first power line includes the shield. Consequently, the robot 1 can suppress radiation noise caused by the first power line.

The robot 1 includes the base B. In the robot 1, the movable section includes the first arm (in this example, the first arm A1) provided on the base and the second arm (in this example, the second arm A2) provided on the first arm. The piping member connects the base and the second arm. Consequently, the robot 1 can prevent at least one of an increase in the weight of the wires passing through the inside of the piping member connected from the base to the second arm and an increase in an occupying rate of the wires on the inside.

Modification 1 of the Embodiment

Figure 3:
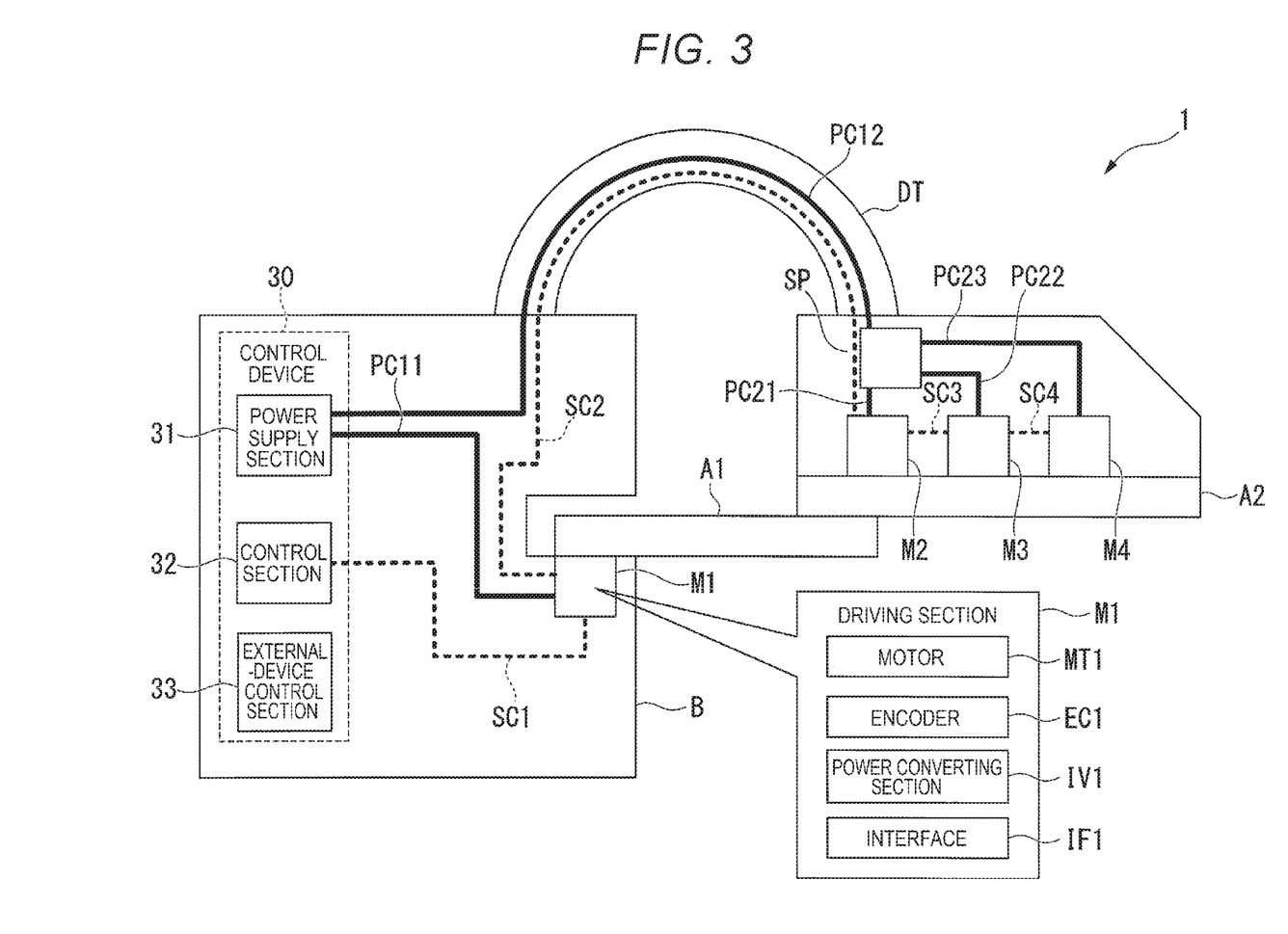
FIG. 3 is a diagram showing an example of a connection form of wires in the robot according to a modification 1 of the embodiment.

A modification 1 of the embodiment is explained below. In the modification 1 of the embodiment, the power line PC12 supplies DC power to a power relay section (for example, power relay) SP shown in FIG. 3 instead of supplying the DC power to the power converting section IV2 of the driving section M2. The power relay section SP supplies the DC power to each of the driving sections M2 to M4. FIG. 3 is a diagram showing an example of a connection form of wires in the robot 1 according to the modification 1 of the embodiment.

As shown in FIG. 3, in the modification 1 of the embodiment, the power relay section SP is provided on the inside of the second arm A2. The power relay section SP supplies electric power to each of the driving sections M2 to M4 in parallel on the basis of the electric power supplied from the power line PC12. That is, the power relay section SP is connected to the power converting section IV2 of the driving section M2 by a power line PC21. The power relay section SP is connected to the power converting section IV3 of the driving section M3 by a power line PC22. The power relay section SP is connected to the power converting section IV4 of the driving section M4 by a power line PC23. That is, in the modification 1 of the embodiment, the electric power supplied from the power line PC12 is supplied to each of the driving sections M2 to M4 by parallel connection via the power relay section SP instead of the daisy-chain connection. Consequently, the robot 1 according to the modification 1 of the embodiment can prevent, with the supply of the electric power to each of the power converting section IV2 of the driving section M2, the power converting section IV3 of the driving section M3, and the power converting section IV4 of the driving section M4 by the power relay section SP, at least one of an increase in the weight of the wires passing through the inside of the piping member DT and an increase in an occupying rate of the wires on the inside. Each of the driving sections M2 to M4 is an example of the second driving section. Each of the power converting section IV2 included in the driving section M2, the power converting section IV3 included in the driving section M3, and the power converting section IV4 included in the driving section M4 is an example of the second power converting section. The power relay section SP is an example of the second power relay section.

As explained above, the robot 1 according to the modification 1 of the embodiment includes the second power relay section (in this example, the power relay section SP) configured to supply electric power to the second driving sections (in this example, the driving sections M2 to M4), which are at least a part of the two or more second driving sections (in this example, the driving sections M2 to M4), in parallel on the basis of the electric power supplied from the one power line (in this example, the power line PC12). In the robot 1, the respective second driving sections include the second power converting sections configured to convert the electric power supplied from the first power line into electric power supplied to the second driving sections. The second power relay section supplies the electric power supplied from the first power line to the second power converting sections respectively included in the second driving sections. Consequently, the robot 1 can prevent, with the supply of the electric power to the second power converting sections of the driving sections by the second power relay section, at least one of an increase in the weight of the wires passing through the inside of the piping member and an increase in an occupying rate of the wires on the inside.

Modification 2 of the Embodiment

Figure 4:
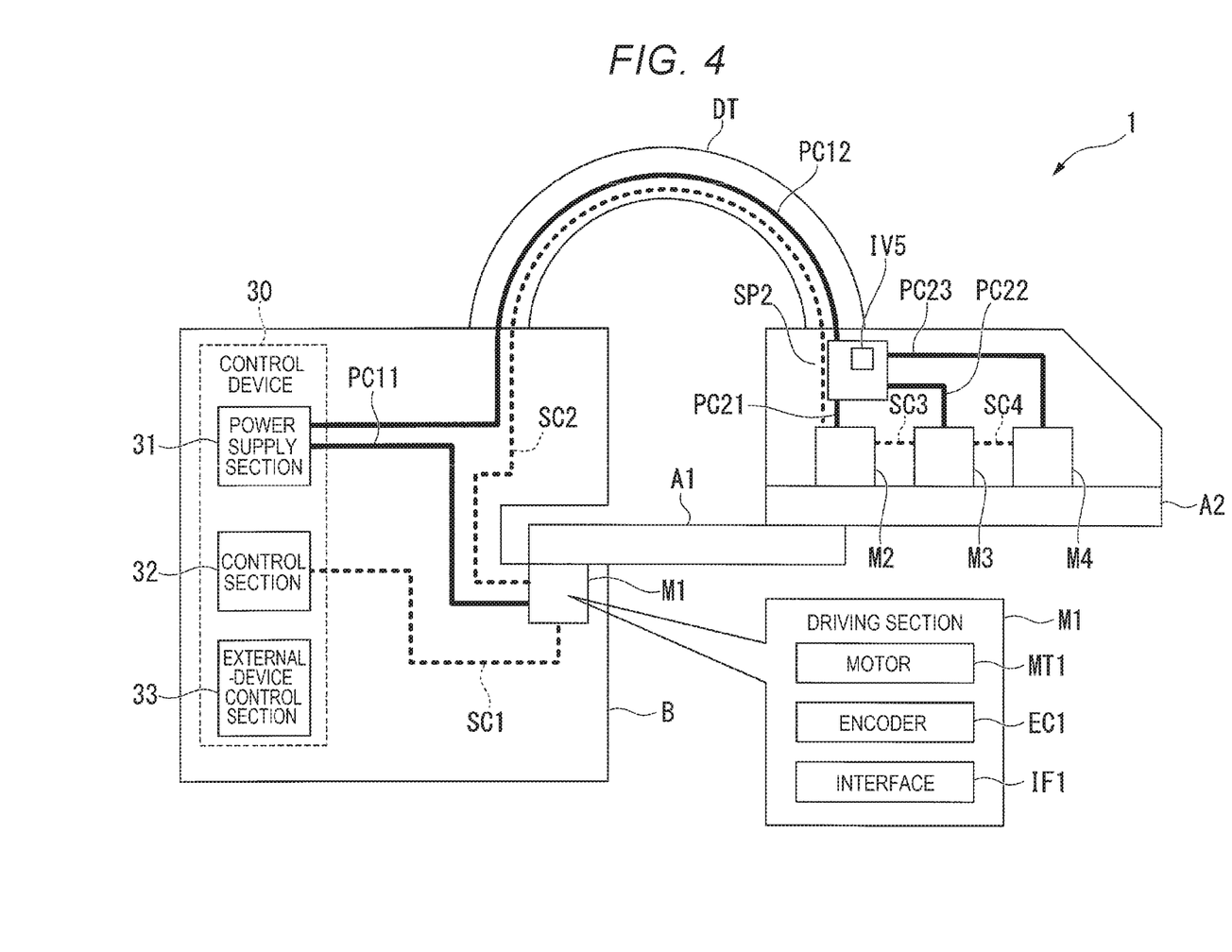
FIG. 4 is a diagram showing an example of a connection form of wires in the robot according to a modification 2 of the embodiment.

A modification 2 of the embodiment is explained below. In the modification 2 of the embodiment, the power line PC12 supplies DC power to a power relay section SP2 shown in FIG. 4 instead of supplying the DC power to the power converting section IV2 of the driving section M2. The power relay section SP2 supplies the DC power to each of the driving sections M2 to M4. FIG. 4 is a diagram showing an example of a connection form of wires in the robot 1 according to the modification 2 of the embodiment.

As shown in FIG. 4, in the modification 2 of the embodiment, the power relay section SP2 is provided on the inside of the second arm A2. The power relay section SP2 supplies electric power to each of the driving sections M2 to M4 in parallel on the basis of the electric power supplied from the power line PC12. The power relay section SP2 includes a power converting section IV5 configured to convert the electric power supplied from the power line PC12 into the electric power supplied to each of the driving sections M2 to M4. That is, in the power relay section SP2, the power converting section IV5 supplies the electric power converted by the power converting section IV5 to each of the driving sections M2 to M4. In this case, the driving section M2 does not include the power converting section IV2, the driving section M3 does not include the power converting section IV3, and the driving section M4 does not include the power converting section IV4. That is, the power converting section IV5 supplies the converted electric power to each of the interface IF2 of the driving section M2, the interface IF3 of the driving section M3, and the interface IF4 of the driving section M4. That is, in the modification 2 of the embodiment, the electric power supplied from the power line PC12 is supplied to each of the driving sections M2 to M4 by parallel connection via the power relay section SP2 instead of the daisy-chain connection. Consequently, the robot 1 according to the modification 2 of the embodiment can prevent, with the supply of the electric power by the power converting section IV5, at least one of an increase in the weight of the wires passing through the inside of the piping member DT and an increase in an occupying rate of the wires on the inside. Each of the driving sections M2 to M4 is an example of the first driving sections. The power converting section IV5 is an example of the first power converting section. The power relay section SP2 is an example of the first power relay section.

As explained above, in the robot 1 according to the modification 2 of the embodiment, the first power relay section (in this example, the power relay section SP2) includes the first power converting section (in this example, the power converting section IV5) configured to convert the electric power supplied from the first power line (in this example, the power line PC12) into the electric power supplied to each of the first driving sections (in this example, the driving sections M2 to M4). In the robot 1, the first power converting section supplies the converted electric power to each of the first driving sections. Consequently, the robot 1 can prevent, with the supply of the electric power by the first power converting section, at least one of an increase in the weight of the wires passing through the inside of the piping member and an increase in an occupying rate of the wires on the inside.

Modification 3 of the Embodiment

A modification 3 of the embodiment is explained below. In the modification 3 of the embodiment, the robot 1 includes four or more driving sections M on the inside of the second arm A2. In the following explanation, for convenience of explanation, two or more driving sections M among the four or more driving sections M are referred to as first driving sections and two or more driving sections other than the first driving sections among the four or more driving sections M are referred to as second driving sections. When the robot 1 includes the four or more driving sections M on the inside of the second arm A2, electric power may be supplied to each of the first driving sections in parallel by the power relay section SP according to the method explained in the modification 1 of the embodiment. Electric power may be supplied to the each of second driving sections in parallel by the power converting section IV2 according to the method explained in the modification 2 of the embodiment. Consequently, the robot 1 can prevent, with the supply of the electric power by the power relay section SP and the supply of the electric power by the power converting section IV5, at least one of an increase in the weight of the wires passing through the inside of the piping member DT and an increase in an occupying rate of the wires on the inside.

Modification 4 of the Embodiment

Figure 5:
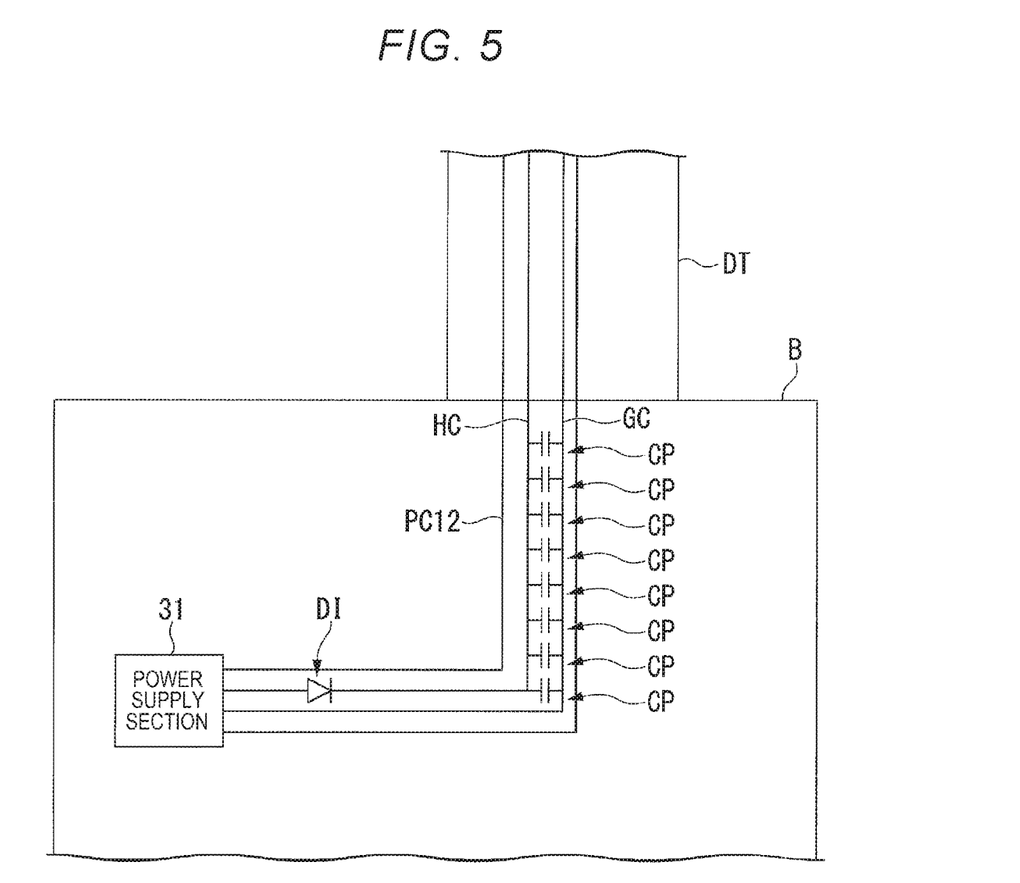
FIG. 5 is a diagram showing an example of the configuration of a power line in the robot according to a modification 4 of the embodiment.

A modification 4 of the embodiment is explained below. FIG. 5 is a diagram showing an example of the configuration of the power line PC12 in the robot 1 according to the modification 4 of the embodiment. In FIG. 5, to clearly show the configuration of the power line PC12, only each of the power supply section 31, the power line PC12, the piping member DT, and the base B is shown. Illustration of the other components is omitted. A wire HC shown in FIG. 5 indicates a wire connected to the twelfth output terminal of the two wires twisted in the power line PC12. A wire GC shown in FIG. 5 indicates a wire connected to the twenty-second output terminal of the two wires twisted in the power line PC12.

As shown in FIG. 5, in the robot 1 according to the modification 4 of the embodiment, one or more capacitance elements CP and a backflow preventing element D1 are provided in the power line PC12. In the example shown in FIG. 5, eight capacitance elements CP are provided in the power line PC12. More specifically, in the example, in the power line PC12, the eight capacitance elements CP are provided between the wire HC and the wire GC. In the example, the backflow preventing element DI is provided in the wire HC.

The capacitance elements CP refer to elements having capacitance for accumulating electric charges of regenerative currents generated in braking of the respective driving sections M2 to M4. The capacitance elements CP are, for example, capacitors. Total capacitance of the eight capacitance elements CP is, for example, 5000 [μF] or more or a value capable of accumulating energy of 5 [J] or more. The total capacitance may be less than 5000 [μF] or may be a value capable of accumulating energy less than 5 [J]. The capacitance elements CP may be any elements instead of the capacitors if the elements have capacitance.

The backflow preventing element DI is an element configured to prevent a backflow of the regenerative currents generated in the braking of the respective driving sections M2 to M4 to the power supply section 31. The backflow preventing element DI is, for example, a diode. The backflow preventing element DI may be any element instead of the diode if the element prevents the backflow.

In this way, each of the one or more capacitance elements CP and the backflow preventing element DI is provided in the power line PC12. Consequently, the robot 1 can prevent an inflow of the regenerative currents generated in the braking of the respective driving sections M2 to M4 into the power supply section 31.

In this example, both of each of the eight capacitance elements CP and the backflow preventing element DI are located on the inside of the robot 1. More specifically, in this example, both of each of the eight capacitance elements CP and the backflow preventing element DI are located on the inside of the base B. Consequently, the robot 1 can prevent the capacitance elements CP from coming off the power line PC12 because of vibration due to the operation of the movable section A. Consequently, the robot 1 can prevent an inflow of the regenerative currents generated in the braking of the respective driving sections M2 to M4 into the power supply section 31 while preventing an increase in the weight of the movable section A. One of each of the eight capacitance elements CP and the backflow preventing element DI may be located on the inside of the robot 1 and the outside of the base B or may be located on the outside of the robot 1.

As explained above, in the robot 1, the capacitance elements (in this example, the capacitance elements CP) having the capacitance for accumulating the electric charges of the regenerative currents generated in the braking of the respective two or more driving sections (in this example, the driving sections M2 to M4) and the backflow preventing element (in this example, the backflow preventing element DI) configured to prevent the backflow of the regenerative currents to the power supply section (in this example, the power supply section 31) are provided in the first power line (in this example, the power line PC12). In the robot 1, one or both of the capacitance elements and the backflow preventing element are located on the inside of the robot 1. Consequently, the robot 1 can prevent an inflow of the regenerative currents into the power supply section.

The embodiment of the invention is explained in detail above with reference to the drawings. However, a specific configuration is not limited to the embodiment. The specific configuration may be, for example, changed, replaced, or deleted without departing from the spirit of the invention.

The entire disclosure of Japanese Patent Application No. 2017-222715, filed Nov. 20, 2017 is expressly incorporated by reference herein.

What is claimed is:
1. A robot comprising:
a base housing a power supply and a controller;
a first arm rotatably connected to the base to rotate about a first axis;
a second arm rotatably connected to a distal end of the first arm to rotate about a second axis that extends parallel to the first axis, the second arm having a housing defining an internal space;
a plurality of motors provided in the internal space of the second arm, the plurality of motors including at least two motors;
a pipe connecting the base to the second arm and bypassing the first arm, the pipe being rotatably connected to the base on a first end to rotate about the first axis at the first end and the pipe being rotatably connected to the second arm on a second end;
a first power line disposed within the pipe and being configured to supply electric power from the power supply to the at least two motors; and
a first signal line disposed within the pipe and being configured to supply a control signal from the controller to the at least two motors,
wherein the first power line is connected to a power supply circuit configured to output a DC voltage and supplies the DC voltage to the plurality of motors, the first power line includes capacitors and a backflow preventing element, the capacitors having capacitance for accumulation electric charges of regenerative currents generated in braking of the respective plurality of motors, and the backflow preventing element being configured to prevent a backflow of the regenerative currents to the power supply circuit, and one or both of the capacitors and the backflow preventing element are located on an inside of the robot.

2. The robot according to claim 1, wherein the electric power supplied from the first power line is supplied to the at least two motors by daisy-chain connection.

3. The robot according to claim 1, further comprising a first power relay configured to supply electric power to each of first motors, which are at least a part of the at least two motors, in parallel on the basis of the electric power supplied from the first power line.

4. The robot according to claim 3, wherein
the first power relay includes first inverters configured to convert the electric power supplied from the first power line into the electric power supplied to each of the first motors, and
the first inverters supply the converted electric power to each of the first motors.

5. The robot according to claim 3, wherein
the respective first motors include second inverters configured to convert the electric power supplied from the first power line into the electric power supplied to the first motors, and
the first power relay supplies the electric power supplied from the first power line to the second inverters respectively included in the first motors.

6. The robot according to claim 1, wherein the power supply circuit is provided on an inside of the robot.

7. The robot according to claim 1, wherein the power line is a twisted cable.

8. The robot according to claim 1, wherein the first power line includes a shield.

9. The robot according to claim 1, further comprising:
a third motor provided in the base; and
a second power line configured to supply electric power from the power supply to the third motor.

10. The robot according to claim 9, wherein
the at least two motors include a first motor and second motor,
the first motor has a first inverter,
the second motor has a second inverter,
the third motor has a third inverter,
the power supply is connected to the first inverter by the first power line,
the first inverter is connected to the second inverter by a third power line, and
the power supply is connected to the third inverter by the second power line.

11. The robot according to claim 9, wherein
the power supply includes a first positive output terminal, a second positive output terminal, a first negative output terminal, and a second negative output terminal,
the first power line is a first wire which includes a first positive wire connected to the first positive output terminal and a first negative wire connected to the first negative output terminal, and
the second power line is a second wire which includes a second positive wire connected to the second positive output terminal and a second negative wire connected to the second negative output terminal.

* * * * *